US010578727B2

(12) United States Patent
Banko et al.

(10) Patent No.: US 10,578,727 B2
(45) Date of Patent: Mar. 3, 2020

(54) METHOD AND PROCESSING UNIT FOR DETECTING A WET OR DAMP ROADWAY AND FOR OBJECT DETECTION

(71) Applicant: Robert Bosch GmbH, Stuttgart (DE)

(72) Inventors: Zoltan Banko, Hevizgyork (HU); Tamas Orosz, Szirmabeseny (HU); Zoltan Braun, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 15/705,831

(22) Filed: Sep. 15, 2017

(65) Prior Publication Data
US 2018/0081046 A1    Mar. 22, 2018

(30) Foreign Application Priority Data

Sep. 22, 2016 (DE) .................... 10 2016 218 238

(51) Int. Cl.
*G01S 7/539*   (2006.01)
*G01S 15/08*   (2006.01)
*G01S 15/931*  (2020.01)
G01S 7/41      (2006.01)
G01S 15/10     (2006.01)

(52) U.S. Cl.
CPC .............. *G01S 7/539* (2013.01); *G01S 15/08* (2013.01); *G01S 15/931* (2013.01); *G01S 7/412* (2013.01); *G01S 15/107* (2013.01)

(58) Field of Classification Search
CPC .......... G01S 7/539; G01S 15/08; G01S 7/412; G01S 15/107; G01S 15/931
See application file for complete search history.

(56) References Cited

U.S. PATENT DOCUMENTS

| 6,714,483 B2* | 3/2004 | Minami ................... G01C 9/00 |
| | | 367/125 |
| 9,227,479 B2* | 1/2016 | Clarke ............... B60G 17/0165 |
| 9,358,983 B2* | 6/2016 | Gilling ................ G01F 23/0061 |
| 9,533,575 B2* | 1/2017 | Tran ................... B60G 17/0165 |
| 9,597,961 B2* | 3/2017 | Tran ................... B60G 17/0165 |
| 9,815,369 B2* | 11/2017 | Tran ................... B60G 17/0165 |

(Continued)

FOREIGN PATENT DOCUMENTS

| DE | 19843563 A1 | 3/2000 |
| DE | 102004050794 A1 | 4/2006 |

(Continued)

OTHER PUBLICATIONS

Translation of DE102011085287A1 (Year: 2011).*

*Primary Examiner* — Daniel Pihulic

(74) *Attorney, Agent, or Firm* — Norton Rose Fulbright US LLP; Gerard Messina

(57) ABSTRACT

In the method for detecting a wet or damp roadway and for detecting objects, first distance signals are initially received. Thereafter, at least one object is detected if the received first distance signals correspond to a distance which is greater than or equal to a certain distance threshold value. If the received first distance signals correspond to a predefined distance which is less than the certain distance threshold value, the received first distance signals are compared to stored second distance signals. A wet or damp roadway is detected as a function of a deviation established by way of this comparison of the received and stored distance signals.

20 Claims, 4 Drawing Sheets

(56) References Cited

U.S. PATENT DOCUMENTS

| | | | | |
|---|---|---|---|---|
| 9,821,659 | B2 * | 11/2017 | Tran | ................... B60G 17/0165 |
| 9,827,853 | B2 * | 11/2017 | Tran | ................... B60G 17/0165 |
| 2009/0009306 | A1 | 1/2009 | Magane et al. | |
| 2014/0293746 | A1 * | 10/2014 | Tran | ........................ G01F 23/00 367/93 |
| 2018/0081046 | A1 * | 3/2018 | Banko | ..................... G01S 7/539 |

FOREIGN PATENT DOCUMENTS

| | | | | |
|---|---|---|---|---|
| DE | 102006037591 | A1 | 2/2008 | |
| DE | 102011085287 | A1 | 5/2013 | |
| DE | 102013202915 | A1 * | 8/2014 | ............ B60W 30/06 |
| DE | 102013207823 | A1 | 10/2014 | |
| DE | 102015206799 | A1 * | 10/2016 | ............ G01S 15/931 |
| DE | 102016201070 | A1 * | 7/2017 | ............ B60W 30/08 |
| DE | 102016218238 | B3 * | 7/2017 | ............ G01S 7/539 |
| DE | 102016213369 | A1 * | 1/2018 | ............ B60W 30/08 |
| EP | 3309580 | A2 * | 4/2018 | ............ G01S 7/539 |
| EP | 3309580 | A3 * | 8/2018 | |
| FR | 3047105 | A1 * | 7/2017 | ............ B60W 30/08 |
| GB | 2548465 | A * | 9/2017 | ............ B60W 30/08 |
| JP | H0378684 | A | 4/1991 | |
| JP | 2009042115 | A * | 2/2009 | |
| JP | 2018066726 | A * | 4/2018 | |
| WO | 2005014315 | A1 | 2/2005 | |
| WO | WO-2016165879 | A1 * | 10/2016 | ............ G01S 15/931 |

\* cited by examiner

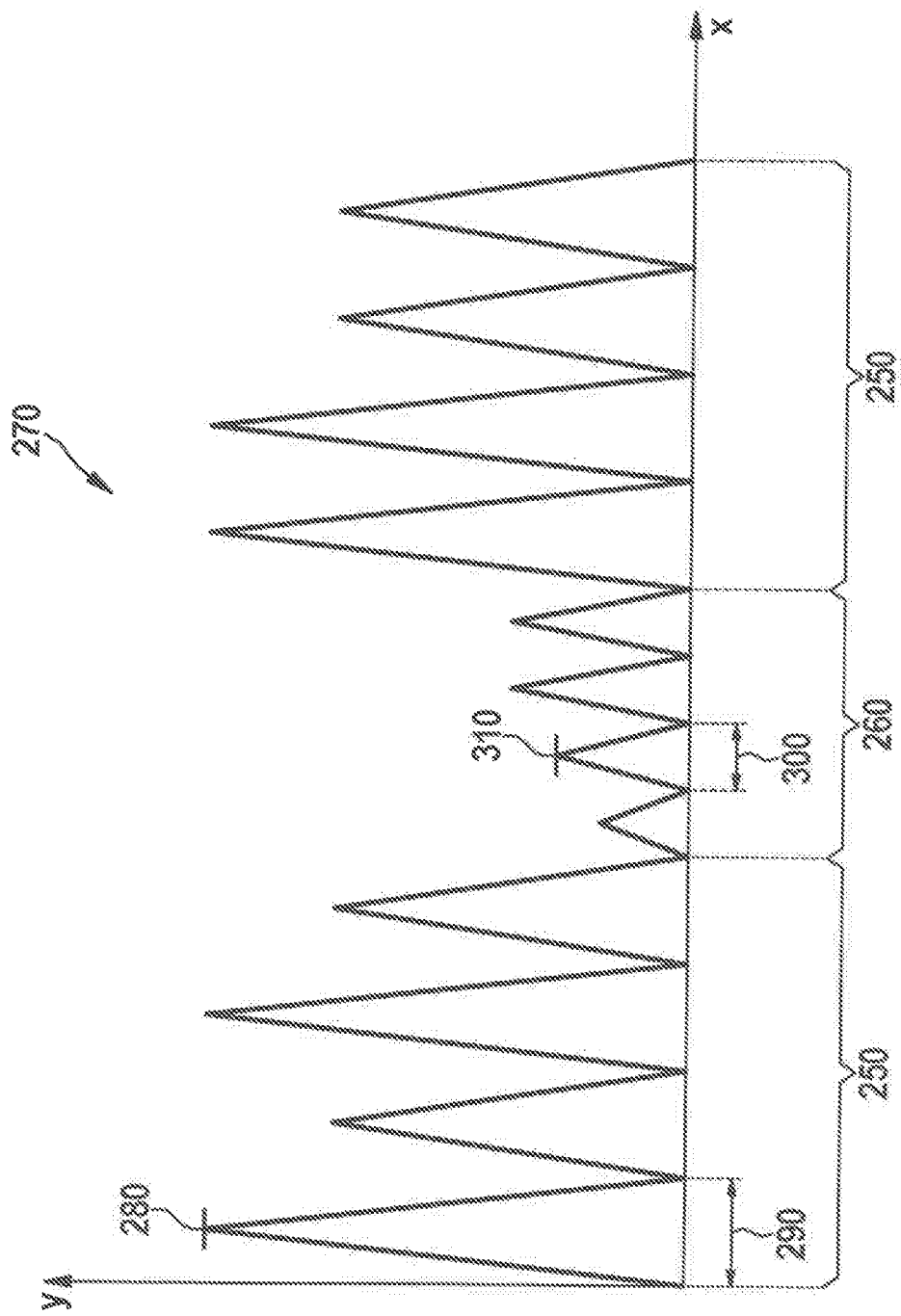

METHOD AND PROCESSING UNIT FOR DETECTING A WET OR DAMP ROADWAY AND FOR OBJECT DETECTION

CROSS REFERENCE

The present application claims the benefit under 35 U.S.C. § 119 of German Patent Application No. DE 102016218238.2 filed on Sep. 22, 2016, which is expressly incorporated herein by reference in its entirety.

BACKGROUND INFORMATION

The present invention relates to a method, a processing unit, and a system for detecting a wet or damp roadway and for the detection of objects.

German Patent Application No. DE 10 2006 037 591 A1 describes a device including at least two ultrasonic sensors for detecting a moving object and for determining possible fault effects due to present surroundings conditions. In this case, an ultrasonic sensor of the device may be used for ascertaining the distance to the object. A further ultrasonic sensor of the device may be designed for measuring the surroundings conditions and determining possible fault effects. The term "surroundings conditions" may also include, for example, the present humidity or rain.

However, to be able to detect an object and to detect a wet or damp roadway with the aid of only one sensor has not been previously described.

SUMMARY

According to the present invention, an example method, a processing unit which carries out the method, and a system including the processing unit for detecting a wet or damp roadway and for detecting objects are provided.

In the example method for detecting a wet or damp roadway and for detecting objects, first distance signals are initially received. Thereafter, at least one object is detected if the received first distance signals correspond to a distance which is greater than or equal to a certain distance threshold value. If the received first distance signals correspond to a predefined distance which is less than the certain distance threshold value, the received first distance signals are compared to stored second distance signals. A wet or damp roadway is detected as a function of a deviation established by way of this comparison of the received and stored distance signals. In this case, the stored second distance signal may represent a signal which also includes, for example, the progression of a distance signal or which represents a permanent or fluctuating, constant value, i.e., a type of threshold value.

As a result of the differentiation of distance signals represented in the method, the distance signals may therefore be utilized, on the one hand, for detecting a wet or damp roadway, and also for detecting objects. If the first received distance signals are received from a predefined distance, a ground echo may be inferred. The predefined distance is therefore a certain, defined distance which is below the distance threshold value. It may therefore be a distance, for example, of 40 cm, the distance threshold value being, for example, 50 cm. In the case that the first received distance signals are received from a distance which is greater than a distance threshold value, these first received distance signals are utilized for the object detection.

Preferably, distance signal amplitudes and/or distance signal widths of the received first distance signals are compared with distance signal amplitudes and/or distance signal widths of the second received distance signals if the received first distance signals correspond to the predefined distance which is less than the certain distance threshold value. Since the distance signal widths and the distance signal amplitudes are an indicator for the energy of a reflected signal and the energy of distance signals includes, for example, a correlation to the dampness of a reflecting object, these may be utilized for detecting a wet or damp roadway.

Preferably, a damp roadway is detected as a function of a first threshold value having been exceeded by the established deviation. Alternatively, a damp roadway is detected as a function of a second threshold value having been exceeded by the established deviation. In this case, the second threshold value is greater than the first threshold value. It is therefore taken into account that received first distance signals, as ground echoes on a damp roadway, often have smaller deviations with respect to stored distance signals than ground echoes on a wet roadway.

The certain distance threshold value is preferably 50 cm. This is a value, above which most distance signals may still be reliably utilized for object detection, but below which the reliable object detection is no longer necessarily given and one may assume that these are ground echoes.

The method is preferably used for detecting a wet or damp roadway for a vehicle. The vehicle serves as an application which is highly relevant in terms of safety, for example. A wet roadway may result, for example, in a longer braking distance.

A change in the wet condition of the roadway may be preferably detected as a function of an increase in the deviation over time established in the comparison of the received and stored distance signals. Alternatively or additionally, the change in the wet condition may be preferably detected as a function of a decrease in the deviation over time established in the comparison of the received and stored distance signals. In this way, the wet condition of the roadway may change, for example, as a result of rain or increasing humidity. The wet condition of the roadway may also change, however, as a result of the roadway drying, for example. The detection of a change in the wet condition of the roadway would therefore have the advantage, for example, that inferences corresponding thereto could be drawn with respect to whether it is raining at the moment. A roadway becoming more damp or wet over time may be attributable to rain. A high relative atmospheric humidity and/or rain may, in turn, have effects on the sensitivity of a detection unit, which could therefore be taken into account. Likewise, on the other hand, the drying of the roadway could indicate that it has not rained for a long time and/or that the atmospheric humidity is dropping. It would therefore also be conceivable to utilize the detection of the wet condition of the roadway to control additional functions, such as the rear fog lights of a vehicle in the event, for example, of fog (and, therefore, high relative atmospheric humidity).

The received first distance signals preferably represent a distance of the at least one detected object or the roadway to a detection unit. In this way, a better comparability of the received distance signals with the other stored distance signals is guaranteed, since it is ensured that distances to the same (distance) detection unit are always detected.

Preferably, the stored second distance signals correspond to a dry roadway. It may therefore be particularly easily established whether a wet or damp roadway is present. In particular, the stored second distance signals may correspond to a dry roadway at the predefined distance. This results in an even greater comparability of the received distance signals with the stored distance signals, whereby a wet or damp roadway may be detected even more reliably.

The received first distance signals preferably represent ultrasonic signals. Ultrasonic signals have a correlation between relative humidity and generated attenuation of the ultrasonic signal. Therefore, received ultrasonic signals have properties which may be used for detecting a wet or damp roadway. Preferably, a measuring cycle of the detection unit including actual ultrasonic signals is ascertained as a function of the number of received ultrasonic signals in the measuring cycle. The received ultrasonic signals correspond, in this case, to the same object distance or roadway distance. "Actual ultrasonic signals" are understood to be, in this case, signals which are to be attributed to object detection or a ground echo and represent, for example, interference signals. Alternatively or additionally, a measuring cycle of the detection unit including actual ultrasonic signals is ascertained as a function of the number of successive measuring cycles of the first detection unit in which ultrasonic signals, which correspond to the same object distance or roadway distance, are received.

Alternatively or additionally, a measuring cycle of the detection unit including actual ultrasonic signals is ascertained as a function of the distance signal widths of the received ultrasonic signals. The received ultrasonic signals are utilized for detecting objects and for detecting a wet or damp roadway as a function of an ascertained measuring cycle of the detection unit including actual ultrasonic signals. It may therefore be ensured that the received ultrasonic signals are actually ground echoes of the roadway or echoes of the detected objects and are not, for example, interference signals. Preferably, a measuring cycle of the detection unit including actual ultrasonic signals is ascertained as a function of at most 6 received ultrasonic signals in one measuring cycle of the first detection unit. This is the maximum number of ultrasonic signals which ultrasonic sensors of the present generation may detect within one measuring cycle.

Preferably, in a further method step at the beginning of the method, an emission direction of the first detection unit is initially adjusted in order to receive first distance signals from a predefined distance which is less than the certain distance threshold value and in order to receive distance signals which are greater than or equal to the certain distance threshold value. It is therefore made possible to receive the ground echoes as well as the object echoes. The adjustment of the emission direction of the first detection unit preferably takes place by way of adjusting the acoustic frequency of the first detection unit. Alternatively, the emission direction is adjusted by way of adjusting the acoustic horn of the first detection unit. By adjusting the acoustic frequency or the acoustic horn of the detection unit in a targeted manner, the sound lobe and, therefore, the detection window of the detection unit may be adjusted in a targeted manner. Therefore, the sound lobe may be adjusted in such a way that it always receives ground echoes of the roadway from the same distance and, simultaneously, echoes from more remote objects may be received.

Preferably, properties characterizing the roadway are additionally received. These are occurrences of roadway unevenness, for example. The comparison of the received first distance signals with stored second distance signals subsequently takes place if the received first distance signals correspond to a predefined distance which is less than the certain distance threshold value of a roadway to the first detection unit. The second stored distance signals which are compared with the first distance signals correspond, in this case, to distance signals which were received from a roadway having the characteristic properties, in particular a dry roadway at the predefined distance having the characteristic properties. The additional reception of characteristic roadway properties and the taking into account of these characteristic properties in the subsequent comparison of the first distance signals with the stored distance signals offers the advantage that ground echoes, which are to be attributed to these characteristic roadway properties and not to a damp or wet roadway, may be ascertained. Occurrences of roadway unevenness may result, for example, in the first distance signals being received from a shorter or longer distance than the predefined distance and may therefore result in an inaccuracy in the detection of a wet or damp roadway.

The present invention also includes a system for detecting a wet roadway, which is made up of a processing unit, a memory unit, a first detection unit, and an output unit. The first detection unit, which represents, in particular, an ultrasonic sensor for blind spot detection or for parking assistance, is designed for detecting first distance values. The memory unit is designed for storing the second distance signals. The output unit is designed for outputting a piece of information regarding a detected wet or damp roadway and a piece of information regarding detected objects. The processing unit carries out the above-described method for detecting a wet or damp roadway and for detecting objects. The system preferably additionally includes a second detection unit for detecting properties characterizing the roadway.

BRIEF DESCRIPTION OF THE DRAWINGS

FIG. 3 schematically shows a signal curve of the received distance signals in the case of a dry roadway and in the case of a wet roadway.

DETAILED DESCRIPTION OF EXAMPLE EMBODIMENTS

Figure 1:
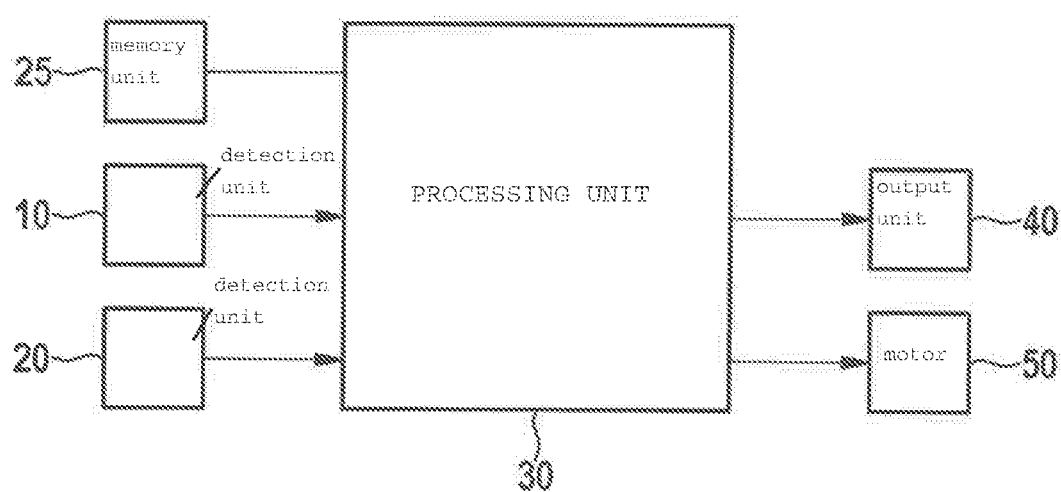
FIG. 1 shows one specific embodiment of the system according to the present invention for detecting a wet or damp roadway and for detecting objects.

FIG. 1 schematically shows an exemplary schematic representation of the system according to the present invention for detecting a wet or damp roadway and for detecting objects. The system includes, in this case, a processing unit 30, a first detection unit 20, a memory unit 25, and an output unit 40. First detection unit 20 is designed for detecting first distance values. First detection unit 20 may represent, for example, an ultrasonic sensor for blind spot detection or for parking assistance. Such ultrasonic sensors offer the advantage in the application of the method according to the present invention that they are utilized even in the close range of, for example, 50 cm to 500 cm and therefore require only a small setting adjustment in order to be able to also receive echoes in the range below 50 cm. Memory unit 25 is designed for storing the second distance signals. In this FIG. 1, memory unit 25 is designed as a server, for example, on which the second distance signals are stored and from which the processing unit receives the second stored distance signals. Alternatively, memory unit 25 may also be integrated, for example, internally into processing unit 30. Output unit 40 is designed for outputting a piece of information regarding a detected wet or damp roadway and a piece of information regarding detected objects. In this case, the information may be digitally displayed, for example, to the driver. Processing unit 30 according to the present invention carries out the method represented in following FIGS. 2a and 2b for detecting a wet or damp roadway and for detecting objects. Optionally, the system additionally includes a second detection unit 10 which is designed for detecting properties characterizing the roadway. In this case, these may be, for example, sensors of an ABS system, which may detect information regarding occurrences of roadway unevenness. Additionally, the system in this FIG. 1 includes a motor 50 for the wiper blades of a vehicle, this motor being activated by the processing unit upon detection of a roadway which is constantly becoming wetter (indication of rain). The motor for the wiper blades is to represent, in this case, only one example of several functions which may be controlled by detecting the wet condition of the roadway.

Figure 2A:
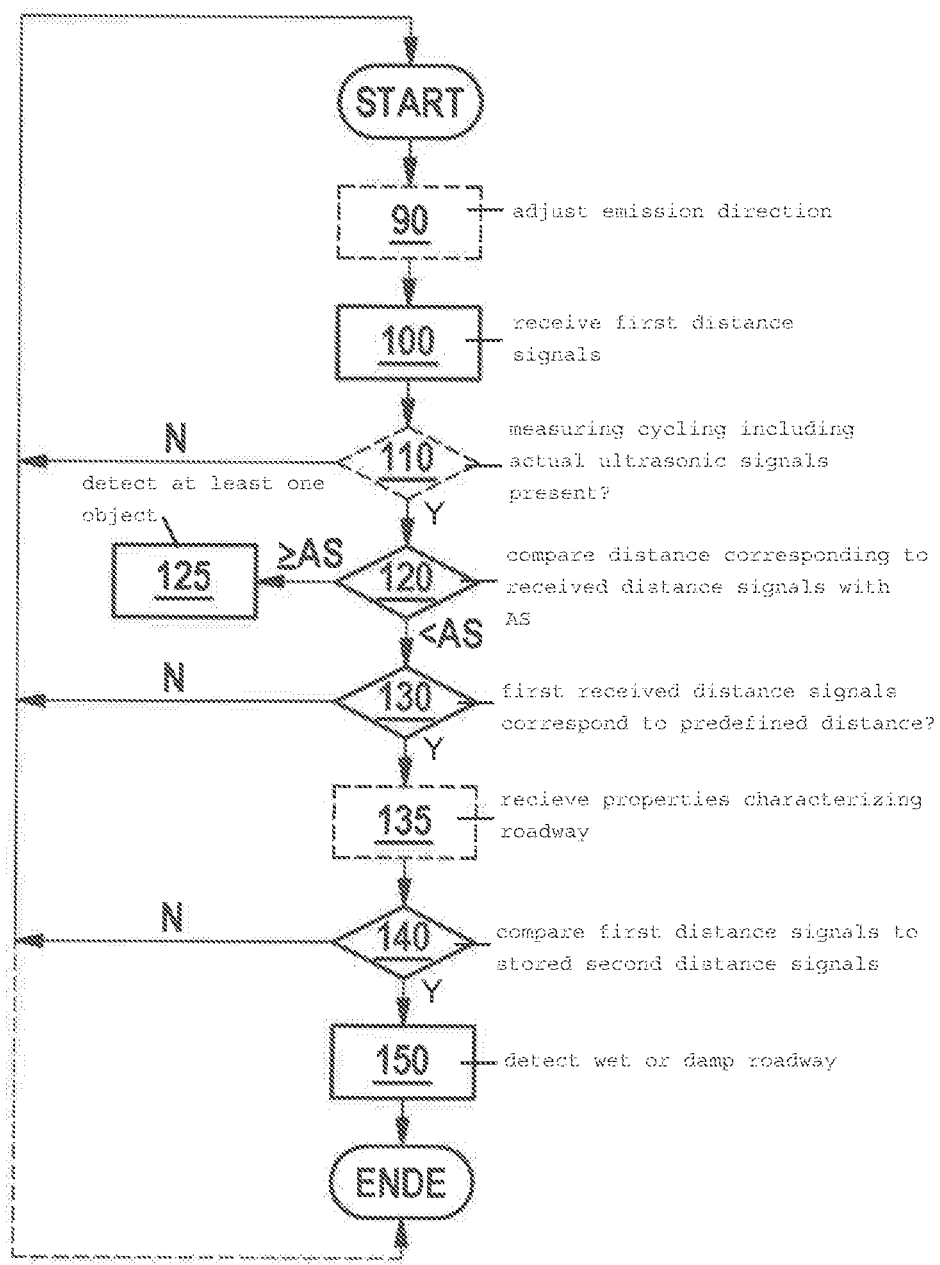
FIG. 2a shows a method sequence according to different specific embodiments of the present invention for detecting a wet or damp roadway and for detecting objects.

In the first exemplary embodiment according to FIG. 2a, the method is started and, in a subsequent first method step 100, the first distance signals are received. In a method step 120 following method step 100, the distance corresponding to the received distance signals is compared with a certain distance threshold value AS. If the received first distance signals correspond to a distance which is greater than or equal to a certain distance threshold value AS, at least one object is detected in method step 125. If the received first distance signals correspond to a predefined distance which is less than certain distance threshold value AS, a check is carried out in a method step 130 following method step 120 to determine whether the received first distance signals correspond to a predefined distance. If the received first distance signals correspond to the predefined distance which is less than the certain distance threshold value, the received first distance signals are compared with the stored second distance signals in a method step 140 following method step 130. If the received first distance signals do not correspond to the predefined distance which is less than the certain distance threshold value, the method is restarted or, alternatively, terminated. If a deviation established in method step 140 by way of the comparison of the received and stored distance signals is too great, a wet or damp roadway is detected in a method step 150 following method step 140. If the deviation is not great enough, the method is restarted or, alternatively, terminated.

In a second exemplary embodiment according to FIG. 2a, the method steps represented in the first exemplary embodiment are carried out. In this second exemplary embodiment, in method step 140, the distance signal amplitudes and/or distance signal widths of the received first distance signals are compared with stored distance signal amplitudes and/or distance signal widths of the second received distance signals if it was established in previous method steps 120 and 130 that the received first distance signals correspond to the predefined distance which is less than specific distance threshold value AS.

In a third exemplary embodiment, the method steps represented in the first and second exemplary embodiments are carried out. Additionally in this case, in method step 90, which is located before method step 100, the emission direction of a first detection unit is adjusted in order to receive first distance signals from a predefined distance which is less than the certain distance threshold value and in order to receive distance signals which are greater than or equal to the certain distance threshold value. The adjustment of the emission direction of the first detection unit takes place, for example, by way of adjusting the acoustic frequency of the first detection unit or by way of adjusting the acoustic horn of the first detection unit.

In a fourth exemplary embodiment, the method steps represented in the first, second, and third exemplary embodiments are carried out. In this exemplary embodiment, the received first distance signals represent a distance from the at least one detected object or the roadway to the first detection unit. In addition, the received first distance signals in this fourth exemplary embodiment represent ultrasonic signals. In this exemplary embodiment, a check is carried out, in an additional method step 110 which follows method step 100, to determine whether a measuring cycle of the first detection unit including actual ultrasonic signals is present. For this purpose, for example, the number of received ultrasonic signals in the measuring cycle is checked, the received ultrasonic signals corresponding to the same object distance or roadway distance. In this way, for example, a measuring cycle of the first detection unit including actual ultrasonic signals may be present only when at most 6 ultrasonic signals are received in one measuring cycle of the first detection unit. Another method is to check the number of successive measuring cycles in which ultrasonic signals corresponding to the same object distance or roadway distance are received. According to one further method, however, for example, the distance signal widths of the received ultrasonic signals within the measuring cycle are checked. If it is established by way of one or several of these methods that a measuring cycle including actual ultrasonic signals is present, the method is continued in method step 120 and the received actual ultrasonic signals are used further within the measuring cycle. If it is established that a measuring cycle including erroneous ultrasonic signals, for example interference signals, is present, the method is restarted or, alternatively, terminated.

In a fifth exemplary embodiment according to FIG. 2a, in addition to the method steps represented in the previous exemplary embodiments, properties characterizing the roadway, such as, for example, occurrences of roadway unevenness, are received in a method step 135 following method step 130. In subsequent method step 140, the received first distance signals are subsequently compared with stored second distance signals corresponding to the dry roadway having the characterizing properties.

Figure 2B:
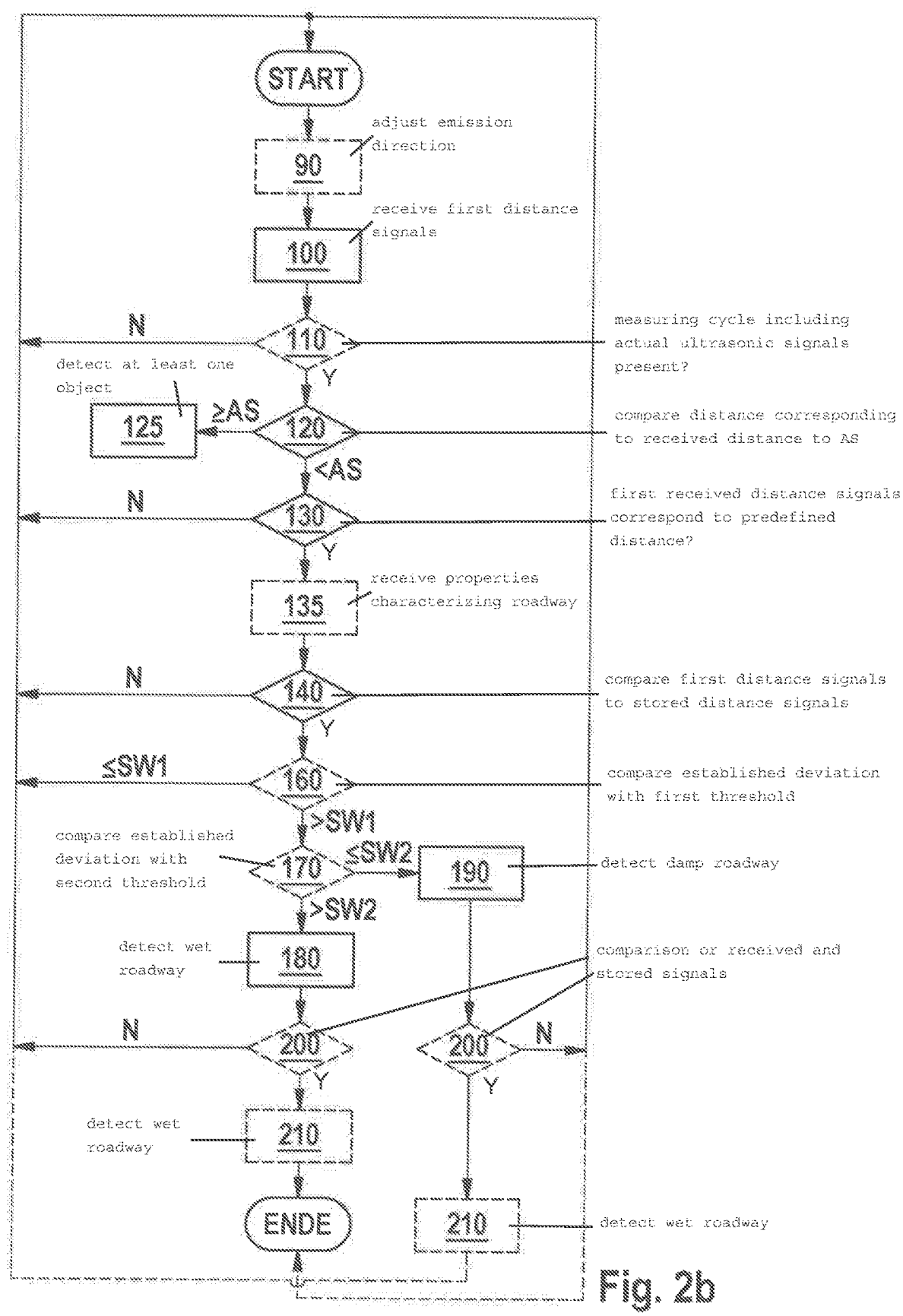
FIG. 2b shows a method sequence according to different further specific embodiments of the present invention for detecting a wet or damp roadway and for detecting objects.

In a sixth exemplary embodiment according to FIG. 2b, in contrast to the preceding exemplary embodiments according to FIG. 2a, the established deviation is compared with a first threshold value SW1 in a method step 160 following method step 140. If it is established in this case that the established deviation is less than or equal to first threshold value SW1, the method is restarted or, alternatively, terminated. If it is established, however, that the established deviation exceeds first threshold value SW1, the method continues in method step 170. In method step 170, the established deviation is compared with a second threshold value SW2 which is greater than first threshold value SW1. If it is established in the comparison that the established deviation is less than or equal to second threshold value SW2, a damp roadway is detected in subsequent method step 190. If it is established in the comparison, however, that the established deviation exceeds second threshold value SW2, a wet roadway is detected in method step 180. Thereupon, the method is terminated.

In a seventh exemplary embodiment, the method steps represented in the sixth exemplary embodiment are carried out. In this case, in addition to the detection of a wet roadway in method step 180 as well as the detection of a damp roadway in method step 190, the check of the increase in the deviation over time established in the comparison of the received and stored distance signals takes place in method step 200. If an increase over time is not established in this case, the method is restarted or, alternatively, terminated. If an increase is established in this case, however, a wet condition of the roadway is detected in method step 210, which is to be attributed, for example, to rain or increasing atmospheric humidity. The method is thereupon terminated.

Diagram 270 represented in FIG. 3 shows, by way of example, a progression of received first distance signals in measuring cycles in the case of dry roadway 250 and a measuring cycle in the case of wet roadway 260. As is apparent in this case, distance signal amplitudes 280 and distance signal widths 290 within the first measuring cycle in the case of dry roadway 250 are considerably greater than distance signal amplitudes 310 and distance signal widths 300 within the measuring cycle in the case of wet roadway 260. This is to be attributed to the greater generated attenuation of the first distance signals on a wet roadway and the resultant lower reflected energy of the distance signals.

The distance threshold value described in the aforementioned exemplary embodiments is, in particular, 50 cm. This is a value, above which ultrasonic sensors for blind spot detection may still be able to reliably detect objects and below which distance values for detecting a wet or damp roadway may be utilized.

The method represented in the aforementioned exemplary embodiments is to be used for detecting a wet or damp roadway and for detecting objects for a vehicle.

What is claimed is:

1. A method for detecting a wet roadway or a damp roadway and for detecting objects, the method comprising:
   receiving first distance signals;
   detecting at least one object when the received first distance signals correspond to a distance which is greater than or equal to a certain distance threshold value;
   comparing the received first distance signals with stored second distance signals when the received first distance signals correspond to a predefined distance which is less than the certain distance threshold value, wherein the stored second distance signals correspond to a dry roadway at the predefined distance; and
   detecting a wet roadway or a damp roadway as a function of a deviation between the received first distance signals and the stored second distance signals exceeding a threshold value, the deviation being determined by way of the comparison of the received first distance signals and the stored second distance signals.

2. The method as recited in claim 1, further comprising:
   comparing at least one of distance signal amplitudes and distance signal widths of the received first distance signals with at least one of stored distance signal amplitudes and distance signal widths of the stored second distance signals when the received first distance signals correspond to the predefined distance which is less than the certain distance threshold value.

3. The method as recited in claim 1, wherein the threshold value includes a first threshold value and a second threshold value, and the method further comprises:
   detecting the damp roadway as a function of the first threshold value having been exceeded by the determined deviation; and
   detecting the wet roadway as a function of the second threshold value having been exceeded by the determined deviation, the second threshold value being greater than the first threshold value.

4. The method as recited in claim 1, wherein the certain distance threshold value is 50 cm.

5. The method as recited in claim 1, wherein the method is used for detecting a wet roadway or a damp roadway for a vehicle.

6. The method as recited in claim 1, further comprising:
   detecting the wet roadway as a function of an increase of the deviation over time between the received first distance signals and the stored second distance signals.

7. The method as recited in claim 1, wherein the received first distance signals represent a distance from the at least one detected object or the roadway to a first detection unit.

8. The method as recited in claim 1, wherein the received first distance signals represent ultrasonic signals.

9. The method as recited in claim 1, further comprising:
   ascertaining a measuring cycle of the first detection unit including actual ultrasonic signals as a function of at least one of: (i) a number of received ultrasonic signals in the measuring cycle, the received ultrasonic signals corresponding to the same object distance or roadway distance, (ii) a number of successive measuring cycles, in which ultrasonic signals corresponding to the same object distance or roadway distance are received, and (iii) the distance signal widths of the received ultrasonic signals within the measuring cycle; and
   utilizing the received ultrasonic signals within the measuring cycle for detecting objects and for detecting the wet roadway or the damp roadway as a function of an ascertained measuring cycle of the first detection unit including actual ultrasonic signals.

10. The method as recited in claim 9, further comprising:
    ascertaining a measuring cycle of the first detection unit including actual ultrasonic signals as a function of at most 6 received ultrasonic signals in a measuring cycle of the first detection unit.

11. The method as recited in claim 7, further comprising:
    adjusting an emission direction of the first detection unit in such a manner that the first detection unit receives the first distance signals from the predefined distance which is less than the certain distance threshold value; and
    adjusting the emission direction of the first detection unit in such a manner that the first detection unit receives the first distance signals which are greater than or equal to the certain distance threshold value.

12. The method as recited in claim 11, wherein the adjusting of the emission direction of the first detection unit is performed by one of: (i) adjusting the acoustic frequency of the first detection unit, or (ii) adjusting an acoustic horn of the first detection unit.

13. The method as recited in claim 1, further comprising:
    receiving properties characterizing the roadway including occurrences of roadway unevenness; and
    comparing the received first distance signals with stored second distance signals when the received first distance signals correspond to a predefined distance, which is less than the certain distance threshold value, from a roadway to the first detection unit, the stored second distance signals corresponding to distance signals from a roadway having the characteristic properties.

14. A processing unit for detecting a wet roadway or a damp roadway and for detecting objects, the processing unit configured to:
    receive first distance signals;

detect objects if the received first distance signals correspond to a distance which is greater than or equal to a specific distance threshold value;

compare the received first distance signals with stored second distance signals if the received first distance signals correspond to a predefined distance which is less than the specific distance threshold value, wherein the stored second distance signals correspond to a dry roadway at the predefined distance; and detect a wet roadway or damp roadway as a function of a deviation between the receive first distance signals and the stored second distance signals exceeding a threshold value, the deviation being determined by way of the comparison of the received first distance signals and the stored second distance signals.

15. The processing unit as recited in claim 14, further configured to:

compare at least one of distance signal amplitudes and distance signal widths of the received first distance signals with at least one of stored distance signal amplitudes and stored distance signal widths of the second stored distance signals if the received first distance signals correspond to the predefined distance which is less than the specific distance threshold value.

16. The processing unit as recited in claim 14, further designed to:

ascertain an actual ultrasonic signal as a function of at least one of: (i) a number of received ultrasonic signals in a measuring cycle of the first detection unit, the received ultrasonic signals corresponding to the same object distance or roadway distance, (ii) a number of successive measuring cycles of the first detection unit, in which ultrasonic signals corresponding to the same object distance or roadway distance are received, and (iii) distance signal widths of the received ultrasonic signals; and utilize the received ultrasonic signals for detecting objects and for detecting a wet roadway or a damp roadway as a function of an ascertained actual ultrasonic signal.

17. The processing unit as recited in one of claim 14, further configured to one of:

detect a damp roadway as a function of a first threshold value having been exceeded by the determined deviation; and detect a wet roadway as a function of a second threshold value having been exceeded by the determined deviation, the second threshold value being greater than the first threshold value.

18. A system for detecting a wet roadway or a damp roadway and for detecting objects, the system comprising:

a processing unit configured to receive first distance signals, detect objects if the received first distance signals correspond to a distance which is greater than or equal to a specific distance threshold value, compare the received first distance signals with stored second distance signals if the received first distance signals correspond to a predefined distance which is less than the specific distance threshold value, wherein the stored second distance signals correspond to a dry roadway at the predefined distance, and detect a wet roadway or damp roadway as a function of a deviation between the received first distance signals exceeding a threshold value, the deviation being determined by way of the comparison of the received first distance signals and the stored second distance signals;

a first detection unit for detecting the first distance signals;

an output unit for outputting a piece of information regarding the detected wet or damp roadway and a piece of information regarding the detected objects; and a memory unit for storing the second distance signals;

where the processing unit is configured to activate the first detection unit to adjust an emission direction of the first detection unit in such a manner that the first detecting unit receives the first distance signals from a predefined distance which is less than the specific distance threshold value, and to activate the first detection unit to adjust the emission direction of the first detection unit in such a manner than the first detection unit receives the first distance signals which are greater than or equal to the specific distance threshold value of the emission direction of the first detection unit.

19. The system as recited in claim 18, further comprising:

at least one second detection unit to detect properties characterizing a current roadway;

wherein the processing unit is further configured to:

compare the received first distance signals with the stored second distance signals if the received first distance signals correspond to a predefined distance which is less than the specific distance threshold value of a roadway to the first detection unit, the stored second distance signals corresponding to distance signals from a roadway having the characteristic properties.

20. The method as recited in claim 18, further comprising:

detecting a rain condition as a function of an increase of the deviation over time between the received first distance signals and the stored second distance signals.

* * * * *